(No Model.) 2 Sheets—Sheet 1.
E. FAHRIG.
PROCESS OF AND APPARATUS FOR MANUFACTURING OZONE GAS.
No. 511,330. Patented Dec. 26, 1893.
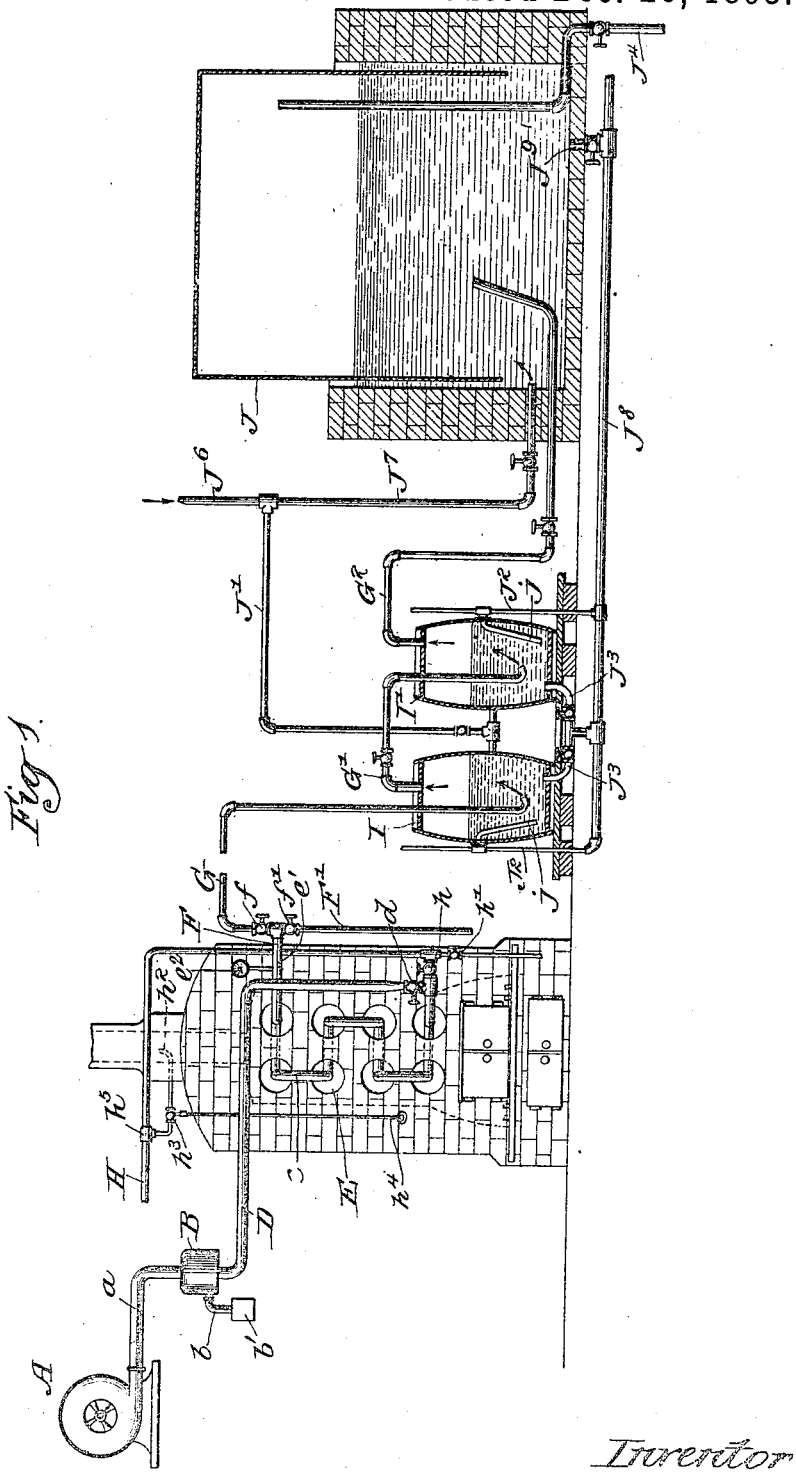

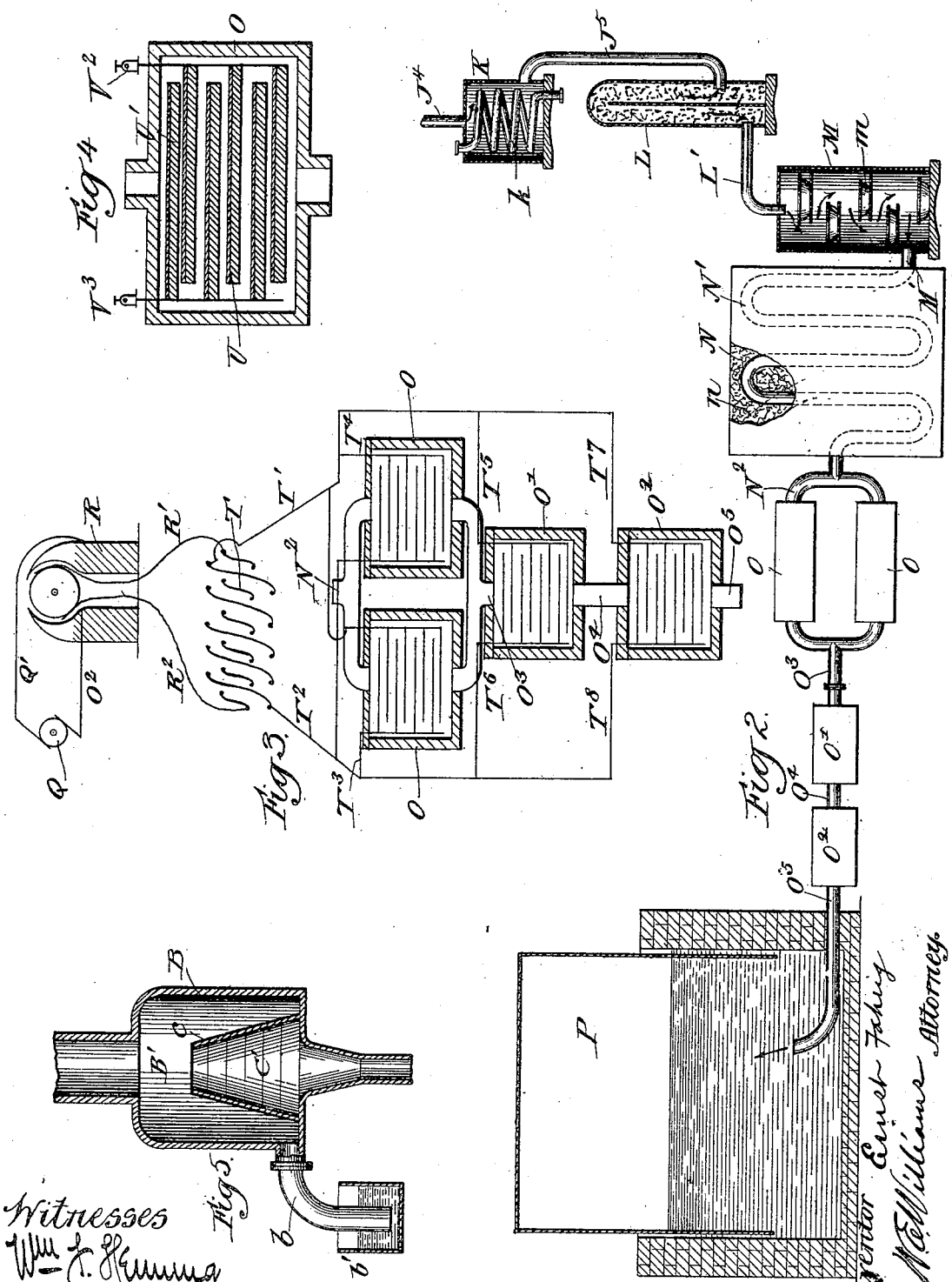

UNITED STATES PATENT OFFICE.

ERNST FAHRIG, OF MARSEILLES, ILLINOIS.

PROCESS OF AND APPARATUS FOR MANUFACTURING OZONE GAS.

SPECIFICATION forming part of Letters Patent No. 511,330, dated December 26, 1893.

Application filed June 13, 1892. Serial No. 436,553. (No model.)

*To all whom it may concern:*

Be it known that I, ERNST FAHRIG, a citizen of the United States, residing at Marseilles, in the county of La Salle and State of Illinois, have invented certain new and useful Improvements in Processes of and Apparatus for Manufacturing Ozone Gas; and I do hereby declare that the following is a full, clear, and exact description of the invention, which will enable others skilled in the art to which it appertains to make use of the same.

The production of ozone gas upon a commercial scale has so far proved unsuccessful and hence as yet it has not been used for industrial purposes. The reason was that the apparatuses used for the production of ozone would not stand the heavy strain required for any length of time. And usually previously prepared oxygen only was employed for the conversion of ozone, and the handling of ozone-containing air was little known. And the methods previously employed were to take the prepared oxygen and ozonize it by passing the electric spark through it. The difficulties encountered were in producing the high tension current and a sufficient electrical sparking surface that would wear at length in service. The Rumkoff coil was ordinarily used and great difficulty was found in making the "breaks" of the current owing to the oxidation of the contact points, and no apparatus as yet constructed would stand any length of time.

My process of producing ozone or ozone-containing atmosphere on a commercial scale rests: first, on my ability to utilize air; second, to eliminate as much as possible all the elements of the air except the oxygen by an absorption process herein described; third, to use a high tension alternating current to reduce said air thus treated to ozone. The air used must be: first, perfectly pure; second, contain as much oxygen as possible; third, be absolutely dry; fourth, at lowest possible degree of cold. And such cold air fully prepared as above can only be ozonized when the discharges of the electricity are even and silent throughout.

My process consists in the following: 1 pass the air through a fan which thoroughly agitates it and breaks up suspended matter and as it were causes the particles to become more free among themselves. With the fan I force the air into the ozonizing apparatus where it first passes through a filter which removes suspended foreign matter and also a portion of the nitrogen is here eliminated. This filter is made of velvet or similar material with a coating of any albuminoid solution. This produces a fine porous membrane which has the property of retaining foreign substances and separates to some extent the nitrogen. Thus purified and filtered the air then is passed to a retort or retorts containing oxygen absorbents, such as manganate of soda and lime $Mn.O_3, NaO.H.O.CaO.$ or other suitable oxygen absorbents. These retorts may be of any ordinary construction and heated by a grate fire, and the air is passed through them and the oxygen is absorbed by the composition and the residue which is mostly nitrogen is passed off through a waste pipe. When the composition in the retort is sufficiently charged with oxygen the valves for the admission of the air and escape of the residue are closed and dry steam at about one and one-half atmosphere pressure is admitted to the retort, during which time the temperature of the composition in the retort is raised from 1,500° to 1,800° Fahrenheit. This steam releases and carries with it the oxygen from the composition and is passed on through condensers and washers of well known construction, wherein the steam is condensed and the oxygen is thus liberated and is then passed to the gas tank from whence it is taken to the electrical apparatus. When the oxygen is all released and carried out from the composition in the retorts by the steam passing through, the steam is shut off and the purified air again admitted and blown through as before and thus the operation may be continued indefinitely.

The oxygen prepared as above is taken from the tank and passed to a heater of any well known construction. It has been found by test that heating the gas at this stage of the process aids in accomplishing the desired result which heater may be of steam coils or other suitable heating apparatus from whence it is dried over calcium chloride or any material capable of drying gases and from here the drying is completed in another chamber containing dishes filled with concentrated sulphuric acid; from thence it is passed to a cooler which may be of any well known construction, e. g., it may be made of coils of pipe around which ice or suitable refrigerating material is placed, and from the cooler the oxygen is passed to the ozonizing generators.

The ozonizing generators consist of one or more square or round chambers connected in multiple, in series, or in multiple series; the first set being large giving plenty of space for the action of the electricity, the next set being small confining the oxygen to completely ozonize every molecule of oxygen passing through. These electrical or ozonizing chambers are provided with a large area of electrical surfaces in two sets connected to the poles of an electrical machine but each set highly insulated from the other thereby compelling the current to discharge itself through the oxygen in the chambers and converting the oxygen into ozone. This electrical machine is composed of an alternating current dynamo and a transformer of special construction, whereby the low tension current of the dynamo is transformed into a current of very high tension which passes through the apparatus converting the oxygen in the chambers into ozone. In the electrical machine we get at the dynamo what is ordinarily termed a low tension alternating current and by means of a specially constructed transformer we get a current which greatly adds to the success of the ozonizing process and combining the two is a desideratum in the process. And from the electrical chambers the ozone gas passes to the gas tank for use.

Apparatus for executing the steps of the process is shown by the accompanying drawings, in which—

Figure 1 is a side elevation showing the fan, retorts and a sectional view through the washers and the gas tank, which apparatus executes one division of the process. Fig. 2 is a side view of an apparatus for the other division of the process, a part of which view through the heater, drier, cooler and gas tank, is sectional. Fig. 3 is a sectional diagram of the electrical apparatus. Fig. 4 is a sectional view through one of the ozonizing chambers. Fig. 5 is a sectional view through the filter.

In the drawings, "A" designates the fan which forces the air into the pipe "$a$" and which carries it to a filter "B." This filter "B" has an outer chamber "B'" in which there is a conical strainer "C'" covering the exit to the pipe "D." This strainer is of wire netting and covered with velvet "C." At the base of the chamber "B'" there is an exit pipe "$b$" running into a trap "$b'$," which trap is filled with water and as the pressure in the chamber "B'" exceeds the weight of the water in the pipe "$b$" the air bubbles out through the water in the trap carrying along with it the foul air and impurities collecting around the base of the filter cloth "C." It is the intent and purpose to force the air in the pipe "$a$" sufficiently that there will be a constant overflow of air through the trap, and we have determined by experiment that the oxygen of the air more readily passes the filter cloth than the nitrogen, and an analysis of the air before and after the filter shows it richer in oxygen than before, and an analysis of the impurities passing the trap "$b'$" shows largely nitrogen, and a desideratum of the process is oxygen, and hence the filter plays a part. From the filter the air passes through the pipe "D" to the retorts "E." The pipe "D" is provided with a valve "$d$" opening and closing the entrance to the retorts "E." The retorts "E" are a set of tubes set in a brick furnace and heated by a grate fire and are connected at alternate ends by pipe "$e$," making a continuous passage for the air through them from the entrance by the pipe "D" to the exit by the pipe "$e'$" to the pipe "F." In the pipe "$e'$" there is fixed a pressure gage "$e^2$" indicating the pressure in the retorts "E." These retorts "E" are filled with oxygen absorbents before described. The pipe "$e'$" connects the pipe "F" by a "T" connection and has a valve "$f$." At the side of the "T" there is connected a waste pipe "F'" provided with a valve "$f'$."

"H" designates a pipe connecting to a steam boiler, which pipe "H" is connected to the pipe entering the retorts at the valve "$h$" and the pipe "H" is drained by the valve "$h'$."

At "$h^5$" there is connected to the pipe "H" a blow pipe "$h^2$" for the purpose of blowing up the fire when the steam is passed through the retorts. The pipe "$h^2$" is provided with a valve "$h^3$" operated by a handle "$h^4$."

The pipe "G" connects the retorts to the washers "I" "I'" which are here shown as casks filled about halfway with water. The nozzle "$g$" of the pipe "G" passes down into the water, thereby admitting the steam under the water, permitting it to bubble up through the water and pass out through the pipe "G'" to the washer "I'" and pass through it the same as the washer "I" and out through the pipe "G$^2$" to the gas tank "J" of ordinary construction.

"J$^6$" is a water supply pipe which supplies water to the washers "I" "I'" by the pipe "J'" and to the gas tank by the pipe "J$^7$." The washers "I" "I'" are drained when desired by the pipes "J$^3$" connecting the waste pipe "J$^8$" and the gas tank is also drained by a pipe "J$^9$" connecting to said pipe "J$^8$." The water is kept circulating through the washers when in use and the surplus water passes out through the pipes "$j$," opening in the base of the washer to prevent the escape of the gases through them and are connected to the pipe "J$^2$" connected to waste pipe "J$^8$."

The oxygen is taken from the gas tank "J" by the pipe "J$^4$" to the heater "K," which heater is shown as a chamber heated by steam coil "$k$." It has been found by test that heating the gas at this stage of the process aids in accomplishing the desired result. From the heater "K" the gas is passed by the pipe "J$^5$" to a drying chamber "L" containing calcium chloride or other suitable drying material and from whence it is passed by the pipe "L'" to another drying chamber "M" containing dishes "$m$" containing concentrated sulphuric acid; from whence it is taken by the pipe "M'" to a cooler which may be of any well known construction, but here shown as pipe "N'" inclosed with refrigerating material "$n$." From the cooler the gas passes to the ozonizer boxes "O," by the pipes "$N^2$." From the first set of ozonizer boxes "O" the gas is passed to the ozonizer box "O'" by the pipe "$O^3$" and from "O'" to "$O^2$" by the pipe "$O^4$," and from the ozonizer box "$O^2$" to the gas tank "P" by the pipe "$O^5$," from which tank "P" the ozone is taken for use. The ozonizer boxes are shown in section in Fig. 4, and are provided with a series of plates "V" of glass or other high insulating material, on the top of which there is a coating of tin foil "V'" or other non-oxidizable metal and are connected alternately with the poles "$V^2$", "$V^3$" of the electrical machine. The current passes through the gas in the ozonizing chambers from one set of plates to the other, thereby converting the oxygen to ozone.

A diagram of the electrical apparatus is shown at Fig. 3, in which "Q" designates the exciter dynamo connected by its mains "Q'," "$Q^2$" to alternating current dynamo "R," connected by mains "R'," "$R^2$" to the transformer "T" connected by mains T', $T^2$, $T^3$, $T^4$, $T^5$, $T^6$, $T^7$, $T^8$ to the plates "V" of the ozonizing chambers "O, O', $O^2$" wherein the current passing through the oxygen converts it into ozone.

The process is composed of several stages each one adding to the success of the result, but any one but the electrical action on the gas may be eliminated and still the process be successful in producing ozone but not of the quality and economy as when all are employed. So therefore I desire to cover the several independent stages of the process as combined with the electrical action, and

What I claim is—

1. The within described process of producing ozone from the air, which consists in passing said air through a fan to agitate it for the purpose described, then filtering said air, then passing it through a retort containing an oxygen absorbent, wherein the oxygen is absorbed from the air and the residue blown off, then releasing said oxygen from said absorbent by means of steam substantially as described, then eliminating said steam from the oxygen by condensing and cooling, then drying said oxygen, and then exposing said oxygen to a powerful silent discharge of electricity, substantially as described, thereby converting the oxygen to ozone.

2. A process of producing ozone from the air by purifying the same, then absorbing the oxygen therefrom by a suitable absorbent, then releasing said oxygen from said absorbent by steam, then eliminating said steam from said oxygen by condensation, then subjecting said oxygen to a powerful silent discharge of electricity substantially as described.

3. A process of obtaining ozone from the air by absorbing the oxygen from the air by a suitable absorbent and again releasing said oxygen from said absorbent by steam, then eliminating said steam from said oxygen by condensation, then subjecting said oxgyen to a powerful discharge of electricity.

4. A process of obtaining ozone from the air by purifying the same, then absorbing oxygen therefrom by a suitable absorbent, then releasing said oxygen from said first absorbent by steam, then eliminating said steam from said oxygen by condensation, then subjecting said oxygen to a powerful discharge of a high tension alternating current of electricity.

5. A process of obtaining ozone from the air, which consists of agitating the same to break up suspended matter, filtering said air, then absorbing oxygen therefrom over a heated composition suitable for the purpose, then releasing said oxygen from said composition by steam, then eliminating said steam from said oxygen by condensation, then drying said oxygen, and then subjecting said oxygen to a powerful discharge of a high tension alternating current of electricity, substantially as described.

6. A process of obtaining ozone from the air by absorbing oxygen therefrom, then releasing said oxygen from said absorbent, then heating said oxygen, then drying said oxygen, then cooling said oxygen and passing through it a current of electricity.

7. An apparatus for producing ozone from the air, which consists essentially of apparatus to force the air into the apparatus, retorts holding oxygen absorbents through which the air is passed, means for heating said retorts, mechanism for cutting off the air supply from the retorts substantially as shown, means for passing steam through the retorts substantially as shown, mechanism for carrying said steam to and through condensers and washers substantially as shown, means for supplying water to the condensers and washers, mechanism for carrying the residue gas from the washers to ozone converting apparatus, chambers for holding the gas, where it is subjected to the action of an electrical current, mechanism for producing and passing an electrical current through the gas, thereby converting the gas to ozone, substantially as described.

ERNST FAHRIG.

Witnesses:
G. MOURATH,
ERNEST GOODELL.